United States Patent [19]
Graves

[11] Patent Number: 4,567,153
[45] Date of Patent: Jan. 28, 1986

[54] POLYMERIZATION CATALYST COMPRISING COPULVERIZED SOLID MAGNESIUM COMPOUND AND SOLID HALIDE OF SCANDIUM

[75] Inventor: Victoria Graves, Crosby, Tex.

[73] Assignee: Exxon Research & Engineering Co., Florham Park, N.J.

[21] Appl. No.: 639,879

[22] Filed: Aug. 13, 1984

[51] Int. Cl.[4] .......................... C08F 4/72; C08F 4/64

[52] U.S. Cl. .......................... 502/113; 502/117; 502/127; 502/133; 502/134; 502/226; 526/114; 526/125

[58] Field of Search .............. 502/226, 105, 113, 134, 502/127, 154, 159, 117, 133

[56] References Cited

U.S. PATENT DOCUMENTS

| | | | |
|---|---|---|---|
| 2,907,757 | 10/1959 | Merckling | 502/154 |
| 4,143,223 | 3/1979 | Toyota et al. | 502/105 |
| 4,384,982 | 5/1983 | Martin | 502/154 |
| 4,384,984 | 5/1983 | Mink et al. | 526/125 |
| 4,393,182 | 7/1983 | Goodall et al. | 526/127 |

*Primary Examiner*—P. E. Konopka
*Attorney, Agent, or Firm*—M. B. Kurtzman

[57] ABSTRACT

An olefin polymerization catalyst produced by copulverizing a magnesium compound and a scandium halide, such as magnesium chloride and scandium chloride which is thereafter treated with one or more Group 4b or 5b transition metal compounds, which when used as a cocatalyst with an organoaluminum compound produces polymers in higher yields than magnesium compounds copulverized with organic esters as previously practiced and having broad molecular weight distribution.

21 Claims, No Drawings

POLYMERIZATION CATALYST COMPRISING COPULVERIZED SOLID MAGNESIUM COMPOUND AND SOLID HALIDE OF SCANDIUM

BACKGROUND OF THE INVENTION

1. Field of the Invention

The present invention relates to a catalyst for use in the polymerization and copolymerization of alpha-olefins such as ethylene and to the process of polymerizing alpha-olefins using the catalyst.

2. Related Art

Highly active polymerization catalysts have been described in the literature which are formed by milling or pulverizing $MgCl_2$ in the presence of an electron donor such as ethyl benzoate followed by treatment with a transition metal compound such as $TiCl_4$. The function of the ethylbenzoate is generally accepted to be the stabilization of small crystallites of $MgCl_2$ to form a more active catalyst surface.

The present invention is directed toward a substitute for ethylbenzoate in the form of an inorganic halide, namely scandium halide, which has the same crystal structure as $MgCl_2$. Unlike ethyl benzoate, the $ScCl_3$ for example becomes an integral part of the support lattice and is not effectively extracted by the aluminum alkyl cocatalyst. Since the concentration of the cocatalyst is not reduced by side reactions with an electron donor of the type normally used, a highly active catalyst results when the $ScCl_3$ doped support is treated with titanium and/or vanadium compound.

U.S. Pat. No. 4,143,223 discloses the preparations of Ti containing catalyst by mechanically pulverizing a magnesium compound and organic ester and impregnating the resultant solid with $TiCl_4$ which was then used with an alkyl aluminum cocatalyst to polymerize an alpha-olefin.

U.S. Pat. No. 2,907,757 discloses that scandium halide combined with a Grignard reagent in an inert hydrocarbon solvent is polymerization catalyst for ethylene.

U.S. Pat. No. 4,384,982 discloses reacting scandium halide with a transition metal compound and an organometallic compound to produce a solid which is treated with a halide ion exchange source to produce an olefin polymerization catalyst. Mixing the catalyst with magnesium chloride was observed to enhance catalyst productivity in polymerization of alpha-oleins.

It is an advantage of the present invention that mechanically pulverized magnesium and titanium and/or vanadium catalysts having improved polymer productivity are produced.

SUMMARY OF THE INVENTION

Briefly in one aspect, the present invention is a supported olefin polymerization catalyst prepared under anhydrous conditions by the steps of:

(a) mechanically copulverizing a solid magnesium compound and solid halide of scandium, preferably scandium chloride, scandium bromide or mixtures thereof, to form a solid copulverized product, (b) treating said copulverized product with one or more compounds of a transition metal of Group 4b or 5b of the Periodic Table of Elements, preferably titanium, vanadium or both, and (c) recovering solid catalyst.

Generally the molar ratio of scandium halide to magnesium halide is from about 0.02 to 0.1, preferably 0.04 to 0.08.

The resulting catalyst is maintained under anhydrous conditions and is used with an organoaluminum cocatalyst to polymerize alpha olefins.

DETAILED DESCRIPTION OF THE INVENTION

The magnesium compound used in this invention is preferably a compound containing a halogen or both a halogen and an organic group (including a member selected from hydrocarbon groups, alkoxy groups, aryloxy groups and acyloxy groups) which may further contain another metal such as aluminum, tin, silicon or germanium. The magnesium compound may be prepared by any method, and may also be a mixture of two or more such compounds. Examples of the magnesium compound are decomposition products of organic Mg compounds such as Grignard reagents. There can also be used complex compounds obtained by dissolving halogen containing magnesium compounds with or without other compounds soluble in acetone and ether, such as $Al(OR)_nX_{3-n}$ (in which R is a hydrocarbon group, X is a halogen atom, and n=0 to 3) or $GeCl_4$, in the aforesaid solvent, and then evaporating the solvent. Of the exemplified compounds, magnesium dihalides and their complex compounds are preferred. Examples of especially preferred magnesium compounds used in this invention are compounds of the formula $MgX^1X^2$ wherein $X^1$ is halogen and $X^2$ represents a member selected from halogen atoms, and the groups OR′ in which R′ is a group selected from the group consisting of alkyl groups, preferably alkyl groups containing 1 to 10 carbon atoms, cycloalkyl groups, preferably cycloalkyl groups containing 6 to 12 carbon atoms, and aryl groups, preferably a phenyl group optionally substituted by an alkyl group containing 1 to 4 carbon atoms. Specific examples include $MgCl_2$, $MgBr_2$, $MgI_2$, $MgF_2$, $Mg(OCH_3)Cl$, $Mg(OC_2H_5)Cl$, $Mg(On—C_4H_9)Cl$ and the like.

Preferably, the magnesium compound is as anhydrous as possible. For the convenience of use, it is advantageous to use the magnesium compound as a powder having an average particle diameter of about 1 to about 50 microns. Since a mechanical pulverization step is essential in the preparation of the titanium/vanadium catalyst component, larger particle sizes are also feasible.

The tetravalent titanium compounds employed in this invention include halides, alkoxyhalides, alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof.

Suitable vanadium compounds include halides, oxyhalides, alkoxyhalides and alkoxides of vanadium such as vanadium tetrachloride, vanadyl trichloride, ethoxyvanadyl dichloride, propoxyvanadyl dichloride, butoxyvanadyl dichloride, diethoxyvanadyl dichloride, dipropoxyvanadyl dichloride dibutoxyvanadyl dichloride, tributoxyvanadyl and any mixtures thereof.

There may be other transition metals of Group 4b and 5b of the Periodic Table of Elements (Periodic Table is shown on the back cover of Handbook of Chemistry and Physics, 45th Ed., The Chemical Rubber Co., 1964), in addition to titanium and/or vanadium present in the catalyst composition, preferably zirconium and and hafnium. Suitable compounds of these additional transition metals include halides, alkoxyhalides, alkoxides and chelate compounds.

Suitable zirconium and hafnium compounds which can be employed herein include those represented by the empirical formula: $M(OR)_xX_y$, wherein M is Zr or Hf, each R is independently a hydrocarbyl group having from 1 to about 20, preferably 1 to about 10, carbon atoms, each X is independently a halogen atom, preferably chlorine or bromine, and x and y independently have values from zero to 4 with the value of x plus y being 4, such as zirconium tetrachloride, zirconium tetrabromide, ethoxytrichlorozirconium, diethoxydichlorozirconium, dibutoxydichlorozirconium, ethoxytrichlorozirconium, butoxytrichlorozirconium, tetraethoxyzirconium, tetrabutoxyzirconium, zirconium acetylacetonate, di(2-ethyl hexoxy)dichlorozirconium hafnium tetrachloride, hafnium tetrabromide, ethoxytrichlorohafnium, diethoxydichlorohafnium, dibutoxydichlorohafnium, ethoxytrichlorohafnium, butoxytrichlorohafnium, tetraethoxyhafnium, tetrabutoxyhafnium, hafnium acetylacetonate, di(2-ethyl hexoxy)dichlorohafnium and any mixture thereof.

The proportions of the foregoing components of the catalyst are such that the atomic ratios of the elements are:

Mg:Transition metal is from about 5:1 to about 100:1; preferably from about 10:1 to 80:1; more preferably 30:1 to 70:1.

It has also been found that after the copulverization of the magnesium compound and the scandium halide, the conventional esters may be copulverized with the resultant Mg/Sc product and retain some of the benefit of the present invention.

Examples of the organic acid ester used in this invention are (i) aliphatic carboxylic acid esters containing 2 to 40 carbon atoms, (ii) alicyclic carboxylic acid esters containing 7 to 20 carbon atoms, (iii) aromatic carboxylic acid esters containing 8 to 40 carbon atoms.

Specific examples of the esters (i) are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate or allyl acetate; primary alkyl esters of unsaturated fatty acids such as methyl acrylate, methyl methacrylate or n-butyl crotonate; and halogenated aliphatic monocarboxylic acid esters such as methyl chloroacetate or ethyl dichloroacetate.

Specific examples of the esters (ii) are methyl cyclohexanecarboxylate, ethyl cyclohexanecarboxylate, methyl methylcyclohexanecarboxylate, and ethyl methylcyclohexanecarboxylate.

Specific examples of the esters (iii) are alkyl benzoates in which the alkyl group is a saturated or unsaturated hydrocarbon group usually containing 1 to 8 carbon atoms, preferably 1 to 4 carbon atoms, such as methyl benzoate, ethyl benzoate, n- or i-propyl benzoate, n-, i-, sec- or tert-butyl benzoate, n- or i-amyl benzoate, n-hexyl benzoate, n-octyl benzoate, 2-ethylhexyl benzoate, vinyl benzoate, and allyl benzoate (preferably methyl benzoate and ethyl benzoate); cycloalkyl benzoates in which the cycloalkyl group is non-aromatic cyclic hydrocarbon group usually containing 3 to 8 carbon atoms, preferably 5 to 6 carbon atoms, such as cyclopentyl benzoate and cyclohexyl benzoate; aryl benzoates in which the aryl group is a hydrocarbon group usually containing 6 to 10 carbon atoms, preferably 6 to 8 carbon atoms in which halogen and/or an alkyl group with 1 to 4 carbon atoms may be bonded to the ring, such as phenyl benzoate, 4-tolyl benzoate, benzyl benzoate, styryl benzoate, 2-chlorophenyl benzoate, and 4-chlorobenzyl benzoate and the like.

The mechanical copulverization is carried out using a ball mill, a vibratory mill, or impact mill or the like preferably in the substantial absence of oxygen or water.

The "mechanical copulverization", as used in this application, denotes pulverization which imparts a violent pulverizing effect to a material, and excludes such means as mere mechanical stirring.

It is essential that the scandium halide be copulverized with the magnesium compound as the first step in the process of preparing the catalyst component. Thereafter the solid copulverized Mg/Sc solid may be contacted with transition metal compounds or esters with further copulverization to complete the catalyst or in the case of liquid materials such as $TiCl_4$ by washing the solid with the liquid. The additional catalyst components may be added sequentially or at one time, although sequential addition is preferred. The order of addition of the addition catalyst components is not critical.

Each copulverization may last from an hour to 48 hours, generally about 10 to 24 hours. The scandium halide becomes an integral part of the support lattice of the magnesium compound serving, it is believed, to block reagglomerization of the small magnesium compound crystallites. This is believed to occur because of the similar crystal structure of the scandium halide and magnesium compound which allows the scandium halide to occupy vacancies at the edges of the crystallites. The prior method of treating with esters, is generally accepted to stabilize the crystallites, however, the esters were susceptible to extraction by the organoaluminum cocatalysts used in polymerizations.

In a second aspect, the invention is a process for polymerizing at least one alpha-olefin under conditions characteristic of Ziegler polymerization wherein the catalyst of the present invention is employed as a cocatalyst with an organometallic compound containing aluminum. Preferred organoaluminum compounds have the empirical formula $AlR_{3-a}X_a$ wherein each R is independently hydrocarbyl as hereinbefore defined such as alkyl, X is a halogen and a is a number from 0 to 3.

Suitable organoaluminum compound include trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum hydrides such as $Al(C_2H_5)_2H$ and $Al(i\text{-}C_4H_9)_2H$, alkylaluminum halides such as $Al(C_2H_5)_2Cl$, $Al(C_2H_5)Cl_2$, $Al(i\text{-}C_4H_9)_2Cl$ and $Al(C_2H_5)_2Br$, alkylaluminum alkoxides such as $Al(C_2H_5)_2(OC_2H_5)$ and $Al(i\text{-}C_4H_9)_2(OC_4H_9)$. The atomic ratio of Al:Transition metals may be in the range of 0.1:1 to 200:1, generally less than 50:1.

In the polymerization process employing the present catalyst, polymerization is effected by adding a catalytic amount of the above catalyst composition and organoaluminum cocatalyst (catalyst system) to a polymerization zone containing alpha-olefin monomer, or vice versa. The polymerization zone is maintained at temperatures in the range from about 0° to about 300° C., preferably at slurry polymerization temperatures, e.g., from about 75° to about 110° C. (about 130° C. to 250° C. for solution polymerization), for a residence time of about a few seconds to several days, preferably 15 seconds to 2 hours. It is generally desirable to carry out the polymerization in the absence of moisture and oxygen with a catalytic amount of the present catalyst being within the range from about 0.0001 to about 0.1 millimoles titanium per liter of diluent. It is understood, however, that the most advantageous catalyst concentration will depend upon polymerization conditions such as temperature, pressure, diluent and presence of catalyst poisons, and that the foregoing range is given to obtain maximum catalyst yields in weight of polymer per unit weight of titanium. Generally the diluent is selected from paraffins and cycloparaffins having 3 to 30 carbon atoms. Suitable diluents include for example isobutane, isopentane, hexane, cyclohexane and the like.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization system to obtain better temperature control and to maintain uniform polymerization mixtures throughout the polymerization zone.

In order to optimize catalyst yields in the slurry polymerization of ethylene, it is preferable to maintain the total system pressure in the range of 100 to 200 psig. To achieve this ethylene is fed on demand.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The catalysts of this invention is especially useful in gas phase polymerization in which a fluidization process is employed.

The monomer or mixture of monomers is contacted with the catalyst system in any conventional manner, preferably by bringing the present catalyst system and monomer together with intimate agitation provided by suitable stirring or other means. Agitation can be continued during polymerization, or in some instances, the polymerization mixture can be allowed to remain unstirred while the polymerization takes place. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The catalysts of this invention are useful for the polymerization of olefins and particularly useful for the polymerization of ethylene and higher alpha olefins (e.g., $C_3$–$C_8$). The advantages of this invention are especially obtained in the polymerization of ethylene to high density polyethylene (density about 0.940–0.960) and the polymerization of ethylene with higher olefins ($C_3$–$C_8$) and/or diolefins to obtain linear low density polyethylenes (density about 0.918–0.958). The preferred comonomers of ethylene are propylene, butene-1, pentene-1, 4-methyl pentene-1, hexene-1 and octene-1.

The polymer is readily recovered from the polymerization mixture by driving off unreacted monomer and/or diluent. No further removal of impurities is required. The resultant polymer is found to contain insignificant amounts of catalyst residue and to possess a relatively broad molecular weight distribution.

The invention will be more clearly understood by reference to the following examples. These examples illustrate specific embodiments of the present invention and should not be construed to limit the invention in any way.

CATALYST PREPARATION

EXAMPLE 1

In an argon filled dry box, ceramic mill jar (237 ml volume) was charged with 99 stainless steel balls of ⅜" diameter. To the jar was charged 10.043 g $MgCl_2$ and 0.817 g anhydrous $ScCl_3$. The mill jar was removed from the dry box and placed on a rotating mill and the contents milled for 16 hours. The solid was removed from the mill jar in the dry box and the contents transferred to a glass flask. To the flask was added 150 ml neat $TiCl_4$. The slurry was agitated, heated to 120° C. and held at this temperature for three hours. The solid was then washed three times with 100 mls fresh hexane. An additional 125 mls of neat $TiCl_4$ was added to the flask and the contents heated at 120° C. for three hours. Finally, the solid was washed five times with hexane and dried under vacuum. The recovered solid weighed 7.97 grams. Metals analysis of the catalyst gave the following results:

18.3 wt % Mg, 0.55 wt % Ti, 1.93 wt % Sc.

The catalysts of Examples 1 and 2 were prepared under the same conditions. The data in the TABLE clearly demonstrate the superior activity of the $ScCl_3$ containing catalyst.

EXAMPLE 2

In a dry box, 10.031 g of $MgCl_2$ and 0.804 g $ScCl_3$ was added to a mill jar (volume 237 ml) containing 99 stainless steel balls of ⅜" diameter. The jar was removed from the dry box and placed on a continuously rotating mill. The solid was milled for sixteen hours, then 2.4 ml of ethyl benzoate was added to the jar and the milling continued for an additional twenty hours. The contents of the jar were then transferred to a glass flask in the dry box and the solid was treated with 150 ml neat $TiCl_4$ at 120° C. for four hours. The solid was then washed five times by decantation with hexane and the solid dried under vacuum. The weight of the recovered catalyst was 12.4 g. Metals analysis of the catalyst showed the following composition:

15.5 wt % Mg, 1.43 wt % Ti, 1.61 wt % Sc.

The polymerization activity of this catalyst is greater than the catalyst containing only ethylbenzoate but is not as great as the scandium containing catalyst without ethylbenzoate (TABLE). This demonstrates that when ethylbenzoate is present in the composition, it can be extracted by the cocatalyst which is then consumed in this side reaction. The catalyst will display less activity because it is cocatalyst "starved".

EXAMPLE 3

In an argon filled dry box, a mill jar (237 ml) was charged with 10.001 g $MgCl_2$, 0.808 g anhydrous $ScCl_3$ and 99 stainless steel balls of ⅜" diameter. The jar was placed on a continuously rotating mill and the solid milled for 16 hours. The jar was then placed in the dry box and 0.57 ml of $VOCl_3$ was added to the jar. The solid was then milled for an additional 20 hours. The solid was transferred in the dry box to a glass flask and treated with 150 ml neat $TiCl_4$ at 120° C. for 3 hours under constant agitation. The solid was then washed five times with 100 ml fresh hexane and dried in vacuuo. The weight of the recovered solid was 8.372 g. Metals analysis of the catalyst gave the following results:

18.7 wt % Mg, 1.26 wt % Ti, 2.04 wt % Sc, 0.346 wt % V.

This example demonstrates the further improvement of multiple transition metal catalysts.

COMPARATIVE EXAMPLE A

Inside an argon filled "dry box", a ceramic mill jar (237 ml volume) was charged with 99 stainless steel balls of ⅜" diameter. To the jar was charged 10 g (0.105 moles) of $MgCl_2$ and 2.4 ml ethylbenzozate (0.0168 moles). The jar was capped, removed from the dry box and placed on a rotating mill. The contents were milled for 16 hours. The solids were then transferred in the dry box to a glass flask to which was charged 150 ml neat $TiCl_4$. The slurry was agitated and heated at 120° C. for three hours. The solid was then washed three times by decantation with hexane and a second treatment with 125 ml of neat $TiCl_4$ was conducted at 120° C. for three hours. The solid was then washed seven times by decantation with 100 ml of hexane and finally dried. The weight of the recovered solid was 7.825 g. Metals analysis gave the following elemental composition:

17.8 wt % Mg, 0.7 wt % Ti.

POLYMERIZATION

Using the catalyst described in Examples 1-4, polymerization runs were made in a 1.6 liter stainless steel autoclave. 760 ml of hexane, 90 mmoles hydrogen, 1.5 mmoles of triethylaluminum cocatalyst as shown in the Table and 30 mg of the catalyst of each Example were added to the autoclave. The slurry was agitated using a stirrer speed of 1200 rpm and the temperature raised to 85° C. Ethylene was admitted to the reactor until a gauge pressure of 150 pounds was achieved. This pressure was maintained throughout the reaction by feeding ethylene continuously. The reaction was continued for forty minutes at which time the ethylene flow was terminated and the reactor vented to atmospheric pressure. The results of the reaction and polymer properties are reported in the Table. The results show clearly the significant increase in activity specific to titanium according to the present invention. The Melt Index (MI) is ASTM D 1238, 2.16 grams, condition B. The High Load Melt Index (HLMI) is ASTM D 1238, 21.6 grams, condition F.

TABLE

| Ex ≠ | Components | mg Cat | Cocat mmoles TEAL* | H2, mmoles | Spec. Activ.** |
|---|---|---|---|---|---|
| A | et Benzoate | 30 | 1.5 | 260 | 70.34 |
| 1 | Sc, Ti | 30 | 1.5 | 260 | 218.60 |
| 2 | Sc, Ti, EB | 30 | 1.5 | 260 | 153.8 |
| 3 | Sc, Ti, V | 30 | 1.5 | 260 | 293.8 |

*TEAL = triethylaluminum
**Spec. Activ = kg PE/ g Ti × hr × atmosphere ethylene

The invention claimed is:

1. A supported olefin polymerization catalyst prepared under anhydrous conditions by the steps of:
(a) mechanically copulverizing a solid magnesium compound and solid halide of scandium to form a solid copulverized product,
(b) treating said copulverized product with one or more compounds of a transition metal of Group 4b or 5b of the Periodic Table of Elements, and
(c) recovering solid catalyst.

2. The supported olefin polymerization catalyst according to claim 1 wherein the magnesium compound contains halogen.

3. The supported olefin polymerization catalyst according to claim 2 wherein said magnesium compound has the formula $MgX^1X^2$ wherein $X^1$ is halogen and $X^2$ represents a member selected from halogen atoms, and the groups OR' in which R' is a group selected from the group consisting of alkyl groups containing 1 to 10 carbon atoms, cycloalkyl groups containing 6 to 12 carbon atoms and a phenyl group or phenyl group substituted by an alkyl group containing 1 to 4 carbon atoms.

4. The supported olefin polymerization catalyst according to claim 3 wherein said magnesium compound is $MgCl_2$.

5. The supported olefin polymerization catalyst according to claim 4 wherein said scandium halide is $ScCl_3$.

6. The supported olefin polymerization catalyst according to claim 1 wherein said transition metal compounds comprise a titanium compound.

7. The supported olefin polymerization catalyst according to claim 1 wherein said transition metal compounds comprise a vanadium compound.

8. The supported olefin polymerization catalyst according to claim 1 wherein said transition metal compound comprises a titanium compound and a vanadium compound.

9. The supported olefin polymerization catalyst according to claim 6 wherein said titanium compounds are halides, alkoxyhalides, alkoxides, siloxyhalides, siloxides, aromatic ring complexes or chelate compounds.

10. The supported olefin polymerization catalyst according to claim 5 wherein the transition metal compound comprises $TiCl_4$.

11. The supported olefin polymerization catalyst according to claim 5 wherein the transition metal compound comprises $VOCl_3$.

12. The supported olefin polymerization catalyst according to claim 5 wherein the transition metal compounds comprise $TiCl_4$ and $VOCl_3$.

13. The supported olefin polymerization catalyst according to claim 1 wherein said transition metal compounds comprise a titanium compound, a vanadium compound, or a titanium compound and a vanadium compound.

14. The supported olefin polymerization catalyst according to claim 1 wherein said transition compound is a zirconium compound, a hafnium compound or a zirconium compound and a hafnium compound.

15. The supported olefin polymerization catalyst according to claim 1 further comprising an organic ester selected from the group consisting of aliphatic carboxylic acid esters, alicylic carboxylic acid esters and aromatic carboxylic acid esters.

16. The supported olefin polymerization catalyst according to claim 15 wherein said organic ester comprises ethyl benzoate.

17. A supported olefin polymerization catalyst prepared under anhydrous conditions obtained by:

(a) mechanically copulverizing a solid magnesium compound and a solid halide of scandium to form a solid copulverized product, the molar ratio of said halide to said magnesium being from about 0.02 to about 0.1, (b) treating said copulverized product with one or more compounds of a transition metal of Group 4b or 5b of the Periodic Table of Elements, the atomic ratio of ratio of magnesium in said copulverized product to said transition metal being from about 5:1 to about 100:1, and (c) recovering solid catalysts.

18. A composition useful as a support for an olefin polymerization catalyst, said composition comprising the product obtained under anhydrous conditions by copulverizing a solid magnesium compound and a solid halide of scandium, the molar ratio of said halide to said magnesium compound being from 0.02 to 0.1.

19. The product of claim 18 wherein said magnesium compound has the formula $MgX^1X^2$ wherein in $X^1$ is halogen and $X^2$ represents a member selected from halogen atoms, and the group OR' in which R' is a group selected from the group consisting from alkyl groups containing 1 to 10 carbon atoms, cycloalkyl groups containing 6 to 12 carbon atoms, aryl group or an aryl group substituted with an alkyl group containing 1 to 4 carbon atoms.

20. The composition of claim 19 wherein said magnesium compound is $MgCl_2$.

21. The composition of claim 20 wherein said scandium halide is $ScCl_3$.

* * * * *